US012755150B2

(12) United States Patent
Gu et al.

(10) Patent No.: US 12,755,150 B2
(45) Date of Patent: Oct. 6, 2026

(54) DATA PROCESSING METHOD, APPARATUS, AND DEVICE, AND COMPUTER-READABLE STORAGE MEDIUM

(71) Applicant: TENCENT CLOUD COMPUTING (BEIJING) CO., LTD, Beijing (CN)

(72) Inventors: Jiaxin Gu, Beijing (CN); Jiaxiang Wu, Beijing (CN); Pengcheng Shen, Beijing (CN); Shaoxin Li, Beijing (CN)

(73) Assignee: TENCENT CLOUD COMPUTING (BEIJING) CO., LTD., Beijing (CN)

( * ) Notice: Subject to any disclaimer, the term of this patent is extended or adjusted under 35 U.S.C. 154(b) by 714 days.

(21) Appl. No.: 18/300,071

(22) Filed: Apr. 13, 2023

(65) Prior Publication Data

US 2023/0252294 A1 Aug. 10, 2023

Related U.S. Application Data

(63) Continuation of application No. PCT/CN2021/106602, filed on Jul. 15, 2021.

(30) Foreign Application Priority Data

May 27, 2021 (CN) ......................... 202110583709.9

(51) Int. Cl.
*G06N 3/08* (2023.01)
*G06N 3/0495* (2023.01)

(52) U.S. Cl.
CPC ............. *G06N 3/08* (2013.01); *G06N 3/0495* (2023.01)

(58) Field of Classification Search
CPC ........ G06N 3/08; G06N 3/0495; G06N 3/082; G06N 3/09; G06V 10/454; G06V 10/82; G06V 40/16; G06V 40/172
See application file for complete search history.

(56) References Cited

U.S. PATENT DOCUMENTS

| | | | | |
|---|---|---|---|---|
| 10,192,327 | B1 * | 1/2019 | Toderici | G06V 10/82 |
| 10,229,356 | B1 * | 3/2019 | Liu | G06N 3/0495 |
| 10,242,266 | B2 * | 3/2019 | Jones | G06N 3/08 |
| 10,387,531 | B1 * | 8/2019 | Vanhoucke | G06N 3/045 |
| 10,417,563 | B1 * | 9/2019 | Commons | G06N 3/08 |
| 10,528,866 | B1 * | 1/2020 | Dai | G06N 3/08 |
| 10,586,531 | B2 * | 3/2020 | van den Oord | G10L 15/16 |
| 10,685,262 | B2 * | 6/2020 | Yao | G06N 3/08 |
| 10,726,330 | B2 * | 7/2020 | Ferdman | G06N 3/045 |
| 10,774,003 | B2 * | 9/2020 | Kakehata | C04B 35/48 |
| 10,902,302 | B2 * | 1/2021 | Fu | G06N 3/063 |
| 10,963,779 | B2 * | 3/2021 | Le | G06N 3/044 |

(Continued)

*Primary Examiner* — Bhavesh V Amin
(74) *Attorney, Agent, or Firm* — ArentFox Schiff LLP

(57) ABSTRACT

A data processing method is provided. In the method, a first model that includes N network layers is obtained. The first model is trained with a first data set that includes first data and training label information of the first data, N being a positive integer. The first model is trained with a second data set. The second data set including second data and training label information of the second data, the second data being quantized. A first unquantized target network layer of the N network layers is quantized. Further, an updated first model that includes the quantized first target network layer is trained with the second data set to obtain a second model.

20 Claims, 5 Drawing Sheets

(56) References Cited

U.S. PATENT DOCUMENTS

| | | | | |
|---|---|---|---|---|
| 11,164,066 | B1 * | 11/2021 | Dai | G06N 3/0442 |
| 11,423,666 | B2 * | 8/2022 | Li | G06N 3/09 |
| 11,568,251 | B1 * | 1/2023 | Palkar | G06F 18/10 |
| 11,615,304 | B1 * | 3/2023 | Palkar | G06V 20/52<br>382/156 |
| 11,689,607 | B2 * | 6/2023 | Pei | G06V 10/82<br>382/100 |
| 11,704,555 | B2 * | 7/2023 | Guo | G06N 3/0464<br>706/25 |
| 11,710,029 | B2 * | 7/2023 | Ooi | G06N 3/045<br>706/25 |
| 11,914,165 | B2 * | 2/2024 | Sun | B23K 26/0006 |
| 12,072,951 | B2 * | 8/2024 | Cardinaux | G06F 17/16 |
| 12,099,915 | B2 * | 9/2024 | Boo | G06N 3/0495 |
| 12,361,703 | B2 * | 7/2025 | Kalantari | G06V 10/95 |
| 12,387,082 | B2 * | 8/2025 | Datta | G06N 3/063 |
| 2014/0168755 | A1 * | 6/2014 | Clowes | B23K 26/0624<br>359/341.1 |
| 2016/0086078 | A1 * | 3/2016 | Ji | G06N 3/084<br>382/157 |
| 2016/0096233 | A1 * | 4/2016 | Duan | B23K 26/0624<br>219/121.79 |
| 2016/0217369 | A1 * | 7/2016 | Annapureddy | G06N 3/04 |
| 2016/0328644 | A1 * | 11/2016 | Lin | G06N 3/0985 |
| 2016/0358073 | A1 * | 12/2016 | Desjardins | G06N 3/08 |
| 2017/0140253 | A1 * | 5/2017 | Wshah | G06N 3/08 |
| 2017/0286830 | A1 * | 10/2017 | El-Yaniv | G06F 7/48 |
| 2017/0330071 | A1 * | 11/2017 | Roblek | G06N 3/084 |
| 2017/0330586 | A1 * | 11/2017 | Roblek | G10L 25/30 |
| 2018/0025257 | A1 * | 1/2018 | van den Oord | H04N 19/50<br>375/240.14 |
| 2018/0032844 | A1 * | 2/2018 | Yao | G06N 3/08 |
| 2018/0046894 | A1 * | 2/2018 | Yao | G06F 7/5443 |
| 2018/0046896 | A1 * | 2/2018 | Yu | G06N 3/063 |
| 2018/0046907 | A1 * | 2/2018 | Ross | G06N 3/063 |
| 2018/0107925 | A1 * | 4/2018 | Choi | G06N 3/063 |
| 2018/0107926 | A1 * | 4/2018 | Choi | G06N 3/063 |
| 2018/0114112 | A1 * | 4/2018 | Willson | G06F 40/274 |
| 2018/0121805 | A1 * | 5/2018 | Stone | G06N 3/08 |
| 2018/0137396 | A1 * | 5/2018 | Szegedy | G06N 3/084 |
| 2018/0181867 | A1 * | 6/2018 | Seibold | G06F 18/217 |
| 2018/0197081 | A1 * | 7/2018 | Ji | G06N 3/0495 |
| 2018/0336425 | A1 * | 11/2018 | Kadav | G06N 3/082 |
| 2018/0336431 | A1 * | 11/2018 | Kadav | G06N 3/082 |
| 2018/0336468 | A1 * | 11/2018 | Kadav | G06N 3/082 |
| 2018/0336469 | A1 * | 11/2018 | O'Connor | G06N 3/084 |
| 2018/0341754 | A1 * | 11/2018 | Fan | G16C 20/50 |
| 2018/0341857 | A1 * | 11/2018 | Lee | G06N 3/082 |
| 2019/0019050 | A1 * | 1/2019 | Roblek | G06V 10/82 |
| 2019/0042948 | A1 * | 2/2019 | Lee | G06F 7/49947 |
| 2019/0102601 | A1 * | 4/2019 | Karpas | G06V 10/82 |
| 2019/0188567 | A1 * | 6/2019 | Yao | G06N 3/082 |
| 2019/0190538 | A1 * | 6/2019 | Park | G06N 3/048 |
| 2019/0213474 | A1 * | 7/2019 | Lin | G06N 3/08 |
| 2019/0244014 | A1 * | 8/2019 | Ranjan | G06F 18/24 |
| 2019/0286708 | A1 * | 9/2019 | Kalchbrenner | G06F 40/44 |
| 2019/0370642 | A1 * | 12/2019 | Liu | G06N 3/063 |
| 2020/0034627 | A1 * | 1/2020 | Zhu | G06N 3/0442 |
| 2020/0057924 | A1 * | 2/2020 | Ioffe | G06N 3/08 |
| 2020/0082534 | A1 * | 3/2020 | Nikolov | G06T 7/11 |
| 2020/0104570 | A1 * | 4/2020 | Kumar | G06V 10/141 |
| 2020/0202213 | A1 * | 6/2020 | Darvish Rouhani | G06N 3/0442 |
| 2020/0202480 | A1 * | 6/2020 | Appu | G06F 9/544 |
| 2020/0250460 | A1 * | 8/2020 | Wang | G06V 10/764 |
| 2020/0250539 | A1 * | 8/2020 | Liu | G06N 3/0464 |
| 2020/0257960 | A1 * | 8/2020 | Gabriel | G06N 3/0464 |
| 2020/0302276 | A1 * | 9/2020 | Yang | G06N 20/10 |
| 2020/0302288 | A1 * | 9/2020 | Ren | G06N 5/046 |
| 2020/0342643 | A1 * | 10/2020 | Gouws | G06N 3/088 |
| 2020/0364576 | A1 * | 11/2020 | Kim | G06N 3/044 |
| 2021/0027103 | A1 * | 1/2021 | Brower | G06N 20/00 |
| 2021/0035565 | A1 * | 2/2021 | Ward | G10L 15/16 |
| 2021/0042573 | A1 * | 2/2021 | Krishnamoorthy | G06F 18/231 |
| 2021/0042623 | A1 * | 2/2021 | Krishnamoorthy | G06N 3/0495 |
| 2021/0042626 | A1 * | 2/2021 | Krishnamoorthy | G06N 3/0495 |
| 2021/0142177 | A1 * | 5/2021 | Mallya | G06N 3/082 |
| 2021/0173905 | A1 * | 6/2021 | Kursun | G06N 3/09 |
| 2021/0216868 | A1 * | 7/2021 | Lovell | G06N 3/08 |
| 2021/0216870 | A1 * | 7/2021 | Ioffe | G06N 3/08 |
| 2021/0248467 | A1 * | 8/2021 | Mohamed | G06N 3/063 |
| 2021/0264237 | A1 * | 8/2021 | Kim | G06F 3/0659 |
| 2021/0374345 | A1 * | 12/2021 | Raman | G06N 3/0895 |
| 2021/0383530 | A1 * | 12/2021 | Peleg | G06T 7/0004 |
| 2022/0108149 | A1 * | 4/2022 | Sohl-Dickstein | G06N 3/045 |
| 2022/0284260 | A1 * | 9/2022 | Patel | G06N 3/10 |
| 2022/0284283 | A1 * | 9/2022 | Yin | G06N 3/08 |
| 2022/0366254 | A1 * | 11/2022 | Zou | G06V 10/98 |
| 2022/0374689 | A1 * | 11/2022 | Li | G06N 3/08 |
| 2022/0391704 | A1 * | 12/2022 | Tsamoura | G06N 3/08 |
| 2023/0334306 | A1 * | 10/2023 | Zhang | G06N 3/08 |
| 2023/0377213 | A1 * | 11/2023 | Naruniec | G06T 11/00 |
| 2023/0385648 | A1 * | 11/2023 | Hong | G06N 3/045 |
| 2023/0401834 | A1 * | 12/2023 | Liang | G06V 10/40 |
| 2024/0120024 | A1 * | 4/2024 | Field | G16B 25/10 |
| 2024/0160892 | A1 * | 5/2024 | Keserwani | G06N 3/04 |
| 2024/0205436 | A1 * | 6/2024 | Chen | H04N 19/117 |
| 2024/0220867 | A1 * | 7/2024 | Nunes Coelho, Jr. | G06N 3/042 |
| 2024/0256833 | A1 * | 8/2024 | Chollet | G06N 3/045 |
| 2025/0088632 | A1 * | 3/2025 | Ahn | H04N 19/124 |
| 2025/0126164 | A1 * | 4/2025 | Grois | H04N 19/154 |
| 2025/0165786 | A1 * | 5/2025 | Lovell | G06N 3/063 |
| 2025/0190752 | A1 * | 6/2025 | Stockel | G06N 3/044 |
| 2025/0210181 | A1 * | 6/2025 | Zhai | G06N 3/0464 |

* cited by examiner

DATA PROCESSING METHOD, APPARATUS, AND DEVICE, AND COMPUTER-READABLE STORAGE MEDIUM

RELATED APPLICATIONS

This application is a continuation of International Application No. PCT/CN2021/106602 entitled "DATA PROCESSING METHOD, APPARATUS AND DEVICE, AND COMPUTER-READABLE STORAGE MEDIUM" and filed on Jul. 15, 2021, which claims priority to Chinese Patent Application No. 202110583709.9, entitled "DATA PROCESSING METHOD, APPARATUS, AND DEVICE, AND COMPUTER-READABLE STORAGE MEDIUM" and filed on May 27, 2021. The entire disclosures of the prior applications are hereby incorporated by reference in their entirety.

FIELD OF THE TECHNOLOGY

This disclosure relates to the field of artificial intelligence, including to a data processing method, apparatus, and device, and a computer-readable storage medium.

BACKGROUND OF THE DISCLOSURE

With the continuous development of computer technologies, more neural network models are applied to various services. For example, face recognition models are applied to face detection, and noise optimization models are applied to noise reduction. Studies show that the representation capability of the neural network model is highly positively correlated with the scale (the number of parameters and the computation amount) of the model. In brief, the precision of a prediction result from a large-scale neural network model is higher than the precision of a prediction result from a small-scale neural network model. However, during deployment, a larger-scale neural network has higher requirements on configuration parameters of a device, such as requiring a larger storage space and a higher operating speed. Therefore, to configure a large-scale neural network in a device having limited storage space or limited power consumption, it is necessary to quantize the large-scale neural network. At present, in the field of artificial intelligence, how to quantize a neural network model has become one of the hot research issues.

SUMMARY

Embodiments of this disclosure include a data processing method, apparatus, and device, and a computer-readable storage medium, to realize model quantization.

According to one aspect, a data processing method is provided. In the method, a first model that includes N network layers is obtained. The first model is trained with a first data set that includes first data and training label information of the first data, N being a positive integer. The first model is trained with a second data set. The second data set including second data and training label information of the second data, the second data being quantized. A first unquantized target network layer of the N network layers is quantized. Further, an updated first model that includes the quantized first target network layer is trained with the second data set to obtain a second model.

According to another aspect, a data processing apparatus including processing circuitry is provided. The processing circuitry is configured to obtain a first model that includes N network layers. The first model is trained with a first data set that includes first data and training label information of the first data. N is a positive integer. The processing circuitry is configured to train the first model with a second data set. The second data set includes second data and training label information of the second data, the second data being quantized. The processing circuitry is configured to quantize a first unquantized target network layer of the N network layers. Further, the processing circuitry is configured to train an updated first model that includes the quantized first target network layer with the second data set to obtain a second model.

Correspondingly, an embodiment of this disclosure further provides a data processing device, including: a storage apparatus and a processor, the storage apparatus storing a computer program, and the processor executing the computer program to implement the data processing method described above.

Correspondingly, an embodiment of this disclosure further provides a non-transitory computer-readable storage medium storing instructions which when executed by a processor cause the processor to perform the data processing method described above.

Correspondingly, this disclosure provides a computer program product or computer program. The computer program product or computer program includes computer instructions, and the computer instructions are stored in a computer-readable storage medium. A processor of a computer device reads the computer instructions from the computer-readable storage medium, and the processor executes the computer instructions, so that the computer device performs the data processing method described above.

In an embodiment of this disclosure, the first model is trained using the first data set, and the first model is trained using the second data set; the first target network layer is determined from the N network layers, and the first target network layer is quantized; and the quantized first model is trained using the second data set, the second target network layer is determined from the N network layers, and the second target network layer is quantized until no unquantized network layer exists among the N network layers, to obtain the second model. It can be seen that during iterative training of the first model, the first model is updated by quantizing the target network layer, so that the scale of the neural network model can be reduced, thereby realizing model quantization.

BRIEF DESCRIPTION OF THE DRAWINGS

To describe the technical solutions in the embodiments of this disclosure more clearly, the following briefly introduces the accompanying drawings. The accompanying drawings in the following description show merely some embodiments of this disclosure. Other embodiments are within the scope of the present disclosure.

DESCRIPTION OF EMBODIMENTS

Figure 1A:
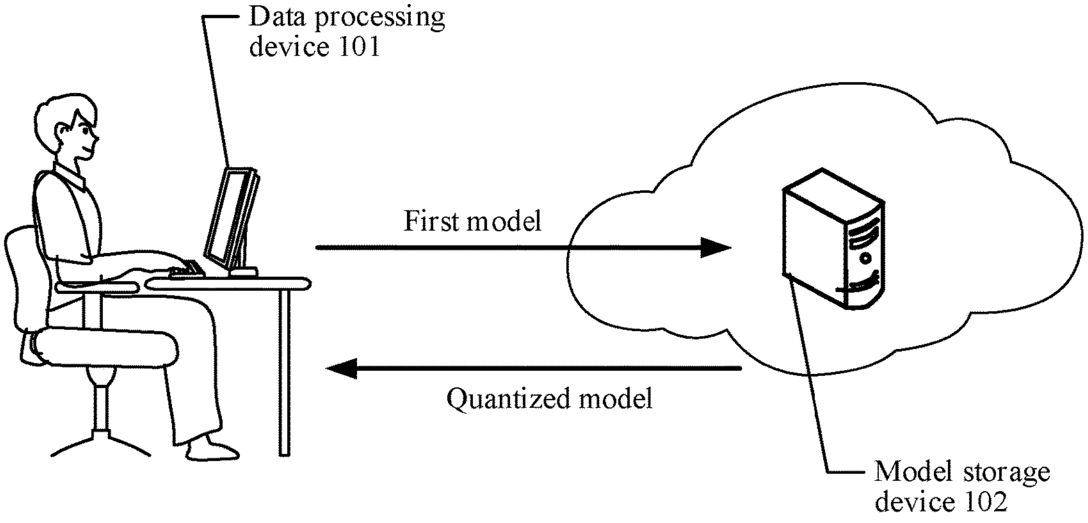
FIG. 1*a* is a schematic structural diagram of a model quantization system according to an embodiment of this disclosure.

Technical solutions in exemplary embodiments of this disclosure are described below with reference to the accompanying drawings.

The embodiments of this disclosure relate to a neural network model. During iterative training, a to-be-converted model is obtained by inserting pseudo-quantization operators in stages into a plurality of to-be-quantized network layers in a to-be-trained model. The to-be-converted model is converted, and the converted model is trained to finally obtain a quantized model corresponding to the to-be-trained model, to reduce the scale of the neural network model.

The representation capability of the neural network model is highly positively correlated with the scale (the number of parameters and the computation amount) of the model. A deeper and wider model generally has a better performance than a smaller model. However, blindly expanding the size of the model can improve face recognition precision, but also creates many obstacles in the actual application and deployment of the model, especially in mobile devices having limited computing power and power consumption. Therefore, after a full-precision pre-trained model is obtained by training, the model is deployed in each device after the pre-trained model is compressed according to its own situation. Compressing the model can be understood as quantizing the model. The following model quantization methods are proposed in the embodiments of this disclosure in the research process of model quantization.

(1) Post-quantization: In an example of post-quantization, a related deep neural network model training method is used for training for a specific model structure and loss function to obtain a full-precision model. The full-precision model is an unquantized model. Then, a specific quantization method is used to quantize parameters of the model to a predetermined number of bits, for example, to int8, i.e., integerization. Next, a small batch of training data is used, for example, the training data is 2,000 images, or the data volume of the training data is much smaller than the data volume of a training set, to obtain an output range of each layer in the model, i.e., the value range of an activation function, so as to quantize the output of each network layer in the model. The model finally obtained is a quantized model. In this case, for a certain network layer, model parameters involved in computation and an activation output of a previous layer are quantized fixed-point numbers, and the activation output of the previous layer is the input of the present layer.

(2) Quantization aware training (QAT): In an example of quantization step of post-quantization, model parameters are simply quantized, and the precision loss caused by quantization cannot be taken into account in a training process. The model parameters are adjusted for quantization itself, and the impact of quantization on the precision of the model is not considered. For this reason, in quantization aware training, pseudo-quantization nodes are inserted behind the model parameters and the activation function to simulate a quantization process. This scheme can simulate post-quantization processing during training, and the quantized model can be obtained after training. In this way, recognition precision loss caused by quantization can be greatly reduced.

(3) Staged layerwise quantization-based model quantization training: During an example of quantization aware training, instead of inserting all pseudo-quantization nodes at one time, pseudo-quantization nodes are inserted layer by layer in stages from shallow to deep according to rules. That is, each time one network layer in the model is quantized, the model is trained. That is, parameters of the model are adjusted. Finally, after all to-be-quantized network layers in the model are quantized and the model converges, an updated model is obtained.

The practice has found that among the three schemes, in the post-quantization, the full-precision model is directly subjected to post-quantization, and a good recognition effect of the quantized model cannot be guaranteed. This is because errors caused by quantization are not taken into account during training of the full-precision model. However, a model often requires extremely high precision, and the errors caused by model quantization lead to wrong recognition results and bring immeasurable losses.

In quantization aware training, quantized model parameters can be adjusted to a certain extent, and the errors caused by a quantization operation can be minimized. However, in practice, the insertion of pseudo-quantization operators at one time can damage the stability of training, causing the model to fail to converge to an optimal point. It is because the pseudo-quantization operators corresponding to the quantization operation lower the representation capability of the model, and a drastic jump of the representation capability causes the model to jump out of the optimal point of original convergence and fall into another suboptimal point.

In staged layerwise quantization-based model quantization training, insertion in stages can divide a "great change" of the model representation capability into several "small jumps", compared with insertion at one time. After the insertion of the pseudo-quantization nodes, a full-precision processing step can be retained for subsequent layers, and the model can gradually adapt to the errors caused by quantization and gradually adjusts parameters of the model. Such a "moderate" model quantization aware training method can greatly reduce interference of quantization errors on model training. The quantized model trained by this method can still maintain a high recognition precision while achieving the benefits of model size reduction and reasoning speed increase, satisfying actual requirements of model application.

From the analysis described above, it can be seen that staged layerwise quantization-based model quantization training can achieve a better effect in actual application. Therefore, this disclosure mainly introduces the staged layerwise quantization-based model quantization training in detail. On the basis of staged layerwise quantization-based model quantization training, this disclosure provides a model quantization system. FIG. 1*a* is a schematic structural diagram of a model quantization system according to an embodiment of this disclosure. The model quantization system shown in FIG. 1*a* includes a data processing device

101 and a model storage device 102. In some examples, both the data processing device 101 and the model storage device 102 are terminals, such as smartphones, tablet computers, portable personal computers, mobile Internet devices (MIDs), or other devices. For example, the smartphone is an Android phone, an iOS phone, or the like. Alternatively, both the data processing device 101 and the model storage device 102 are servers, such as independent physical servers, or server clusters or distributed systems composed of a plurality of physical servers, or cloud servers that provide basic cloud computing services such as cloud services, cloud databases, cloud computing, cloud functions, cloud storage, network services, cloud communication, middleware services, domain name services, security services, content delivery networks (CDNs), and big data and artificial intelligence platforms.

FIG. 1*a* illustrates an example in which the data processing device 101 is a terminal, and the model storage device 102 is a server. The model storage device 102 is mainly configured to store a trained first model. The first model is trained by the model storage device 102 using a first data set, or is trained by another device using the first data set and then uploaded to the model storage device 102 for storage. The first data set includes full-precision first data and a training label of the first data. The full-precision first data is unprocessed first data. In an example, the model storage device 102 is a node in a blockchain network, and is capable of storing the first model in a blockchain. The blockchain is a novel application mode of computer technologies such as distributed data storage, point-to-point transmission, consensus mechanism, and encryption algorithm. The blockchain is essentially a decentralized database, and is a series of data blocks linked to each other using cryptographic methods. A distributed ledger connected by the blockchain allows multiple parties to effectively record a transaction, which can be verified permanently (tamper proofing). Data in the blockchain cannot be tampered with, and storing the first model in the blockchain can ensure the security of the first model.

In a case that the first model needs to be deployed in the data processing device 101, the data processing device 101 first obtains configuration parameters, such as storage space, operating memory, power consumption, of the data processing device, then determines whether the configuration parameters of the data processing device match a deployment condition of the first model, and if the configuration parameters of the data processing device match the deployment condition of the first model, directly obtains the first model from the model storage device 102 and deploys the first model in the data processing device. If the configuration parameters of the data processing device do not match the deployment condition of the first model, the data processing device 101 quantizes, by the staged layerwise quantization-based model quantization training proposed above, the first model obtained from the model storage device 102 to obtain a quantized model, where a deployment condition of the quantized model matches the configuration parameters of the data processing device, and then deploys the quantized model in the data processing device 101. In some embodiments, obtaining the first model from the model storage device may be understood as communicating with or accessing the first model in the model storage device.

Subsequently, the data processing device 101 acquires to-be-processed data, and invokes the quantized model to recognize the to-be-processed data to output a recognition result. For example, the quantized model is a face recognition model, and the data processing device 101 acquires to-be-recognized face data (i.e., the to-be-processed data), and invokes the quantized model to recognize the to-be-recognized face data to output a recognition result.

Figure 1B:
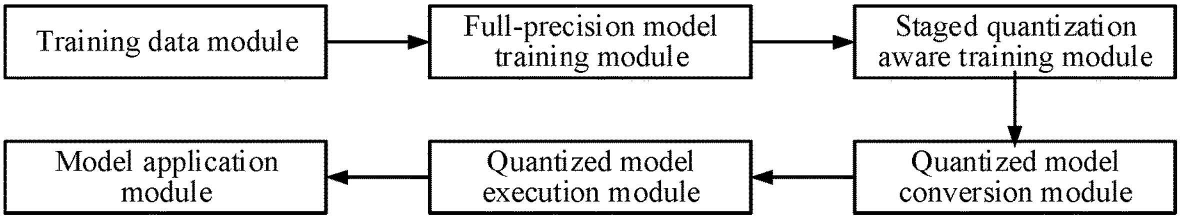
FIG. 1*b* is a schematic structural diagram of another model quantization system according to an embodiment of this disclosure.

Based on the model quantization system described above, an embodiment of this disclosure further provides a schematic structural diagram of another model quantization system, as shown in FIG. 1*b*. In FIG. 1*b*, the model quantization system includes a training data module, a full-precision model training module, a staged quantization aware training module, a quantized model conversion module, a quantized model execution module, and a model application module. The training data module is mainly responsible for pre-processing data required by the full-precision model module and the staged quantization aware training module. In an example, in a full-precision model training stage, the training data module provides original training data, and the training data is in a pre-processed and normalized full-precision form. In a staged quantization aware training stage, the training data module provides quantized training data, and the training data is in a pre-processed and normalized quantized form. For the data pre-processed form required by the staged quantization aware training module, reference needs to be made to some limitations of the subsequent quantized model execution module. For example, a commonly used TNN (a mobile-end deep learning reasoning framework) quantized model execution framework only supports input in a symmetrical quantization form within the range of −1 to +1. Therefore, this module needs to process the training data into a corresponding symmetrical quantization form within the range of −1 to +1.

The full-precision model training module is a neural network training module, and is configured to provide a high-precision pre-trained model for the subsequent staged quantization aware training module. In an example, a full-precision model training step is divided into: (0) initializing model parameters; (1) obtaining training data of a specific size and a label corresponding to the training data; (2) performing reasoning using the full-precision model to obtain a prediction result, and using the label to determine a model loss according to a pre-designed loss function; (3) determining the gradient of each parameter according to the loss; (4) updating the model parameters according to a pre-specified method; (5) repeating (1)-(4) until the model converges; and (6) obtaining a full-precision first model, which is an unquantized model.

The staged quantization aware training module is configured to quantize to-be-quantized network layers in the first model, and insert pseudo-quantization nodes layer by layer in stages from shallow to deep according to rules, to obtain an updated first model.

The quantized model conversion module is configured to perform model conversion on the updated first model to obtain a quantized model. Since the updated first model obtained in the staged quantization aware training module contains pseudo-quantization operators, and the model parameters are still full-precision, further processing is required. The quantized model execution module is configured to process inputted to-be-predicted data to obtain a prediction result. Compared with full-precision floating-point number calculation, quantized fixed-point number calculation requires the support of corresponding underlying instructions of a processor. The quantized model execution module uses the quantized model obtained in the quantized model conversion module to reason input data to obtain a prediction result. Taking int8 quantization as an example, frameworks such as open-source projects TNN and NCNN (a neural network forward computing framework) can provide special underlying support and optimization for int8 numerical calculation, so as to truly leverage the advantages of model quantization. The model application module is configured to deploy the quantized model in the data processing device.

To sum up, the process of model quantization performed by the model quantization system shown in FIG. 1*b* can be summarized as follows. (1) The staged quantization aware training model obtains a first model from a full-precision model training module. The first model includes N network layers. The first model is obtained by iteratively training an initial model using a first data set. In an example, the first data set is provided by the training data module, and the first data set includes full-precision first data and a training label of the first data. Full-precision data is raw data that is not processed, i.e., not quantized, compressed, blurred, cropped, or the like. (2) The staged quantization aware training module obtains a second data set from the training data module, and uses the second data set to iteratively train the first model. The second data set includes quantized second data and a training label corresponding to the second data. For a signal, quantization can be understood as converting a continuous signal into a discrete signal. For an image, quantization can be understood as reducing the definition of the image. For data, quantization can be understood as converting high-precision data into low-precision data. (3) During iterative training, if it is detected that the current number of iterations satisfies a target condition, for example, the current number of iterations is exactly divisible by P, where P is a positive integer, an unquantized target network layer is determined from the N network layers. In an embodiment, the target network layer is an unquantized network layer in a network layer set composed of convolutional layers and fully connected layers in the first model. Further, the target network layer is quantized, for example, parameters in the target network layer are operated on by pseudo-quantization operators, and the first model is updated using the quantized target network layer. (4) The updated first model is updated using the second data set, that is, the second data is inputted into the updated first model, and the parameters of the N network layers of the updated first model are updated according to the output result of the updated first model and the training label of the second data, to obtain a second model. It can be understood that by repeating steps (3) and (4), during iterative training, the to-be-quantized network layers in the first model can be quantized step by step, that is, perform quantization in stages, until all to-be-quantized network layers in the first model are quantized and the first model converges, to obtain the second model. Further, quantization conversion is performed on the second model by the quantized model conversion module. In an example, quantization conversion is performed on network parameters in the second model based on a quantization coefficient to obtain a final quantized model. The quantized model execution module invokes the quantized model converted by the quantized model conversion module to process to-be-processed data, to obtain a processing result. For example, the quantized model converted by the quantized model conversion module is a face recognition model. The quantized model execution module invokes the face recognition model to recognize to-be-recognized face data to obtain a face recognition result. The to-be-recognized face data is the to-be-processed data, and the face recognition result is the processing result. In addition, the quantized model converted by the quantized model conversion module can also be deployed in the data processing device by the model application module. For example, the face recognition model is deployed in a camera by the model application module. The face recognition model is the quantized model, and the camera is the data processing device.

Figure 2:
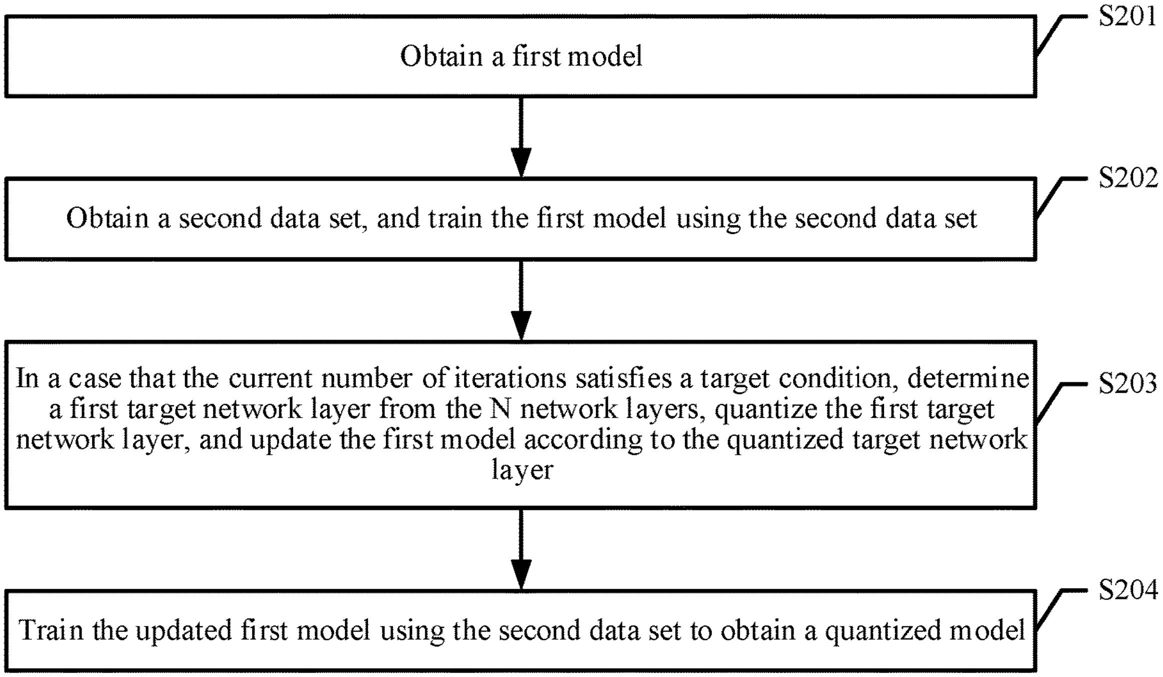
FIG. 2 is a flowchart of a data processing method according to an embodiment of this disclosure.

FIG. 2 is a flowchart of a data processing method according to an embodiment of this disclosure. The method is performed by a data processing device. The method in this embodiment of this disclosure may include the following steps.

In step S201, obtain a first model. In some embodiments, obtaining a first model may be understood as communicating with or accessing a first model.

The first model is a model that is obtained by training an initial model using full-precision training data. The initial model is a face recognition model, a noise recognition model, a text recognition model, a disease prediction model, or the like. The first model is obtained by iteratively training the initial model using a first data set. The first data set includes full-precision first data and a training label of the first data. Full-precision data is raw data that is not processed, i.e., not quantized, compressed, blurred, or cropped, or the like. The training label of the first data is used for optimizing parameters in the first model. In an example, the first model is a full-precision model trained to convergence, and the process of training the first model includes: (1) obtaining training data of a specific size, i.e., obtaining first data in a first data set and a label corresponding to the first data; (2) perform reasoning using the full-precision model to obtain a prediction result, and using the training label to determine a model loss according to a pre-designed loss function; (3) determining the gradient of each parameter according to the loss; (4) updating model parameters according to a target manner, so that a prediction result of the model after optimization is closer to the training label of the first data than that before optimization; (5) repeating (1)-(4) until the model converges; and (6) obtaining a full-precision first model.

The first model includes N network layers, and N is a positive integer.

In step S202, obtain a second data set, and train the first model using the second data set.

The second data set includes quantized second data and a training label corresponding to the second data, and the training label corresponding to the second data is used for optimizing parameters in the first model. For a signal, quantization can be understood as converting a continuous signal into a discrete signal. For an image, quantization can be understood as reducing the definition of the image. For data, quantization can be understood as converting high-precision data to low-precision data, such as converting floating-point data to integer data.

Training the first model using a second data set is: inputting the second data into the first model and optimizing parameters of the N network layers of the first model according to an output result of the first model and the training label of the second data, so that the prediction result of the model after optimization is closer to the training label of the second data than that before the optimization. In an example, each training includes forward operation and reverse operation. The reverse operation is also called backward operation. The forward operation is, after the training data is inputted into the first model, weighting the inputted data by neurons in the N network layers of the first model, and outputting a prediction result of the training data according to a weighting result. The reverse operation is determining a model loss according to the prediction result, the training label corresponding to the training data, and the loss function corresponding to the first model, and determining the gradient of each parameter according to the loss, so as to update the parameters of the first model, so that the prediction result of the first model after the update is closer to the training label corresponding to the training data than that before the update.

In an example, the second data set is obtained after the first data set is quantized. During quantization, it is also necessary to consider the limitation of a quantized model in execution. For example, a commonly used TNN quantized model execution framework only supports input in a symmetrical quantization form within the range of −1 to +1. Therefore, this module needs to process the training data into a corresponding symmetrical quantization form within the range of −1 to +1.

According to the content of step S201 and step S202, it can be known that the data processing device trains the first model using the first data set, and then trains the first model using the second data set. The first data set includes the first data and the training label of the first data, and the first data is unprocessed data. The second data set includes the second data and the training label of the second data, and the second data is quantized data. Training the first model using the first data set is performing multiple iterative trainings on the first model using the first data set to obtain a trained first model.

In step S203, in a case that the current number of iterations satisfies a target condition, determine a first target network layer from the N network layers, quantize the first target network layer, and update the first model according to the quantized target network layer.

The target condition is a condition that needs to be satisfied to determine the target network layer. In an example, the target condition is specified by a user. For example, the user specifies that in a case that the number of iterations is the third, fifth, eleventh, nineteenth, or twenty-third time, a target network layer is to be selected and then quantized. In an example, the target condition is set by a developer so that the number of iterations satisfies a certain rule. For example, the developer sets that after every P iterations, a target network layer is to be selected and then quantized, where P is a positive integer. In another example, if the current number of iterations satisfies a target rule, a target network layer is to be selected and then quantized. For example, the target rule is a geometric sequence, an arithmetic sequence, or the like. The target condition may also be that, in a case that the data processing device detects that the first model converges, a target network layer is to be selected and then quantized. The first target network layer is an unquantized network layer.

In an implementation, the target network layer is specified by a user. For example, the user specifies that network layer 3, network layer 10, and network layer 15 of the first model are to be quantized one by one. In an example, the target network layer is determined by the data processing device from the first model according to a determining condition. For example, the data processing device performs determination one by one from shallow to deep. For example, if the network layer determined by the data processing device currently is a $j^{th}$ network layer, the first j−1 layers do not satisfy the determining condition of the target network layer, where j is a positive integer, and j is less than or equal to N. In a case that the $j^{th}$ network layer is a target layer, and the $j^{th}$ network layer has not been quantized, the $j^{th}$ network layer is determined as the target network layer. For example, the target layer is a convolutional layer or a fully connected layer.

Further, the process of quantizing the target network layer by the data processing device includes: obtaining a quantization coefficient, and determining a pseudo-quantization operator based on the quantization coefficient and a first parameter. The first parameter is a parameter in the target network layer. In an embodiment, the first parameter is a parameter having the largest absolute value in the target network layer. The first parameter and the pseudo-quantization operator are subjected to a target operation, and the parameter in the target network layer is replaced with a target operation result. The target operation result is a parameter obtained by the target operation. The first model is updated according to the quantized target network layer. For example, the target network layer before quantization in the first model is replaced with the quantized target network layer, so as to update the first model.

After updating the first model according to the quantized target network layer, parameters in one or more network layers other than the target network layer in the first model also need to be updated accordingly, so that the prediction result of the updated first model is closer to an actual result. The actual result is the training label of the second data.

According to the content described above, it can be seen that the process of quantizing the target network layer by the data processing device is obtaining a quantization coefficient, constructing a pseudo-quantization operator based on the quantization coefficient, using the pseudo-quantization operator to perform operation on the first parameter, and replacing the first parameter using an operation result. The first parameter is a parameter in the first target network layer.

The pseudo-quantization operator is a function including the quantization coefficient, and the pseudo-quantization operator is used for performing operation on any parameter to perform pseudo-quantization on the parameter. In an example, the pseudo-quantization operators include a quantization operator and an inverse quantization operator.

In step S204, train the updated first model using the second data set to obtain a quantized model.

In an implementation, the data processing device inputs the second data into the updated first model, and according to the output result of the updated first model and the training label of the second data, updates the parameters of the network layers of the updated first model, so that the prediction result of the updated first model is closer to the actual result, so as to obtain the quantized model. The actual result is the training label of the second data.

It can be understood that, during iterative training, by repeating steps S203 and S204, the data processing device quantizes to-be-quantized network layers step by step in a to-be-quantized network model, i.e., quantization is performed in stages. That is, one to-be-quantized network layer is selected for quantization each time from the to-be-quantized network model, until all the to-be-quantized network layers in the to-be-quantized network model are quantized and the first model converges, to obtain a final quantized model. The practice has found that processing a model by the data processing method provided in this disclosure can reduce the scale of the neural network model, preserve the representation capability of the neural network model, and reduce the recognition precision loss caused by directly quantizing all network layers in the neural network model.

According to the content described above, it can be seen that the data processing device performs multiple iterations to obtain the second model. That is, the first model is trained using the second data set, and the first target network layer is determined from the N network layers, where the first network layer is an unquantized network layer. The data processing device quantizes the first target network layer, trains the quantized first model using the second data set, and determines the second target network layer from the N network layers, where the second target network layer is an unquantized network layer. The data processing device quantizes the second target network layer until no unquantized network layer exists among the N network layers, to obtain the second model.

During each iteration, the data processing device trains the first model using the second data set, and then quantizes the target network layer to obtain the quantized first model. A condition for stopping the iteration is that no unquantized network layer exists among the N network layers. Therefore, during each iteration, the data processing device selects at least one target network layer from the N network layers for quantization, thereby performing multiple quantization in stages. Quantization and training are performed alternately to quantize all of the N network layers gradually, so that the model gradually adapts to errors caused by quantization. Compared with quantizing all network layers at one time, the solutions of this embodiment of this disclosure can preserve the representation capability of the model and reduce the errors caused by quantization.

In this embodiment of this disclosure, the first model and the second data set are obtained, and the first model is trained using the second data set. The first target network layer is determined from the N network layers, and the first target network layer is quantized. The quantized first model is trained using the second data set, the second target network layer is determined from the N network layers, and the second target network layer is quantized until no unquantized network layer exists among the N network layers, to obtain the second model. It can be seen that during iterative training of the first model, the first model is updated by quantizing the target network layer, so that the scale of the neural network model can be reduced, thereby realizing model quantization.

Figure 3:
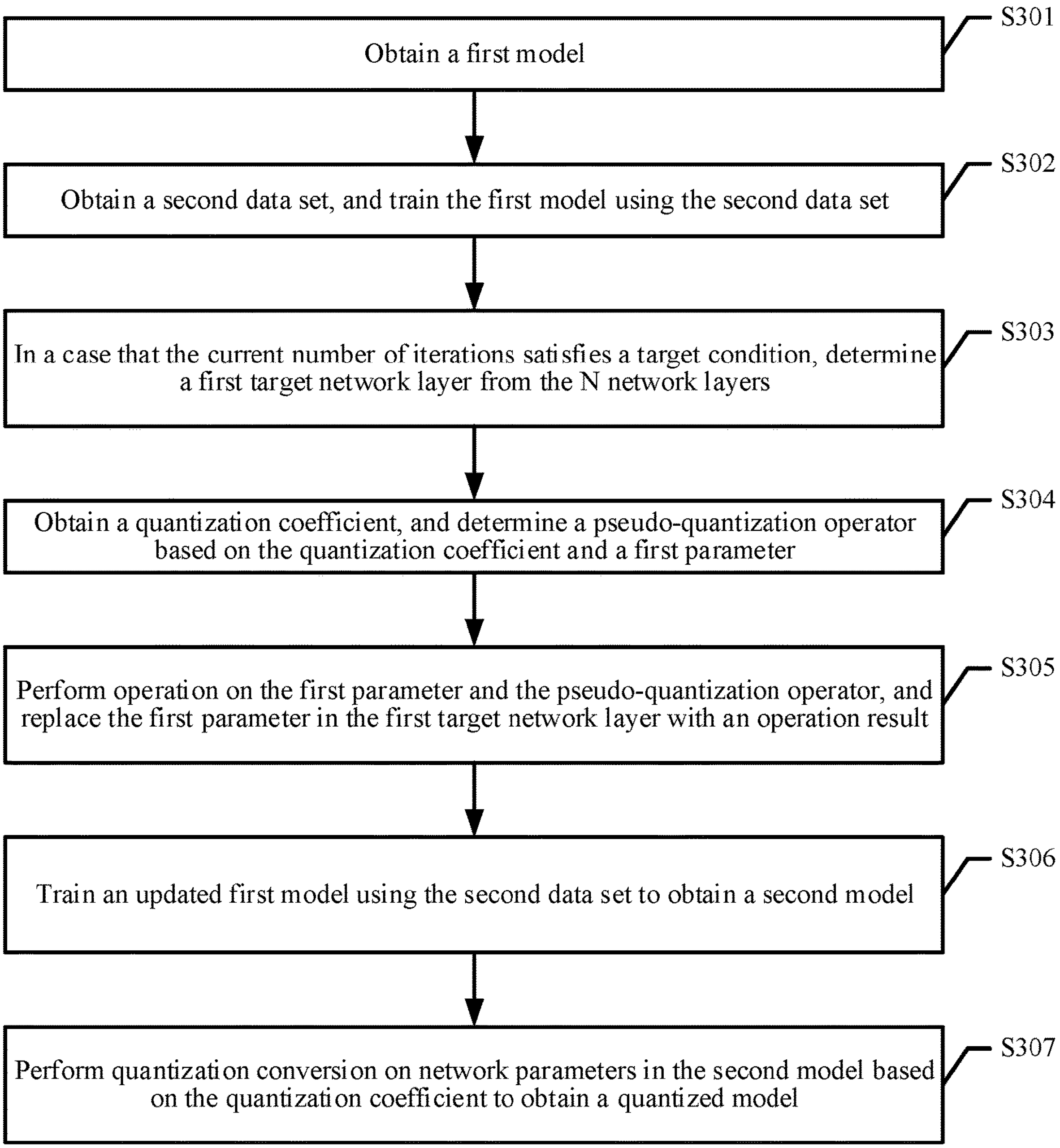
FIG. 3 is a flowchart of another data processing method according to an embodiment of this disclosure.

FIG. 3 is a flowchart of another data processing method according to an embodiment of this disclosure. The method is performed by a data processing device. The method in this embodiment of this disclosure may include the following steps.

In step S301, obtain a first model. In some embodiments, obtaining a first model may be understood as communicating with or accessing a first model.

In an implementation, in response to a request for deploying a first model in a data processing device, the data processing device obtains the first model. After obtaining the first model, the data processing device determines, according to configuration parameters of the data processing device, whether a deployment condition for deploying the first model is satisfied. The configuration parameters of the data processing device include storage space, processing power, power consumption, and the like. In response to the configuration parameters of the data processing device not matching the deployment condition of the first model, the data processing device continues to perform step S302 to step S308 or perform step S202 to step S204 to obtain a quantized model corresponding to the first model, and deploys the quantized model in response to the deployment condition of the quantized model matching the configuration parameters of the data processing device. Correspondingly, in a case that the configuration parameters of the data processing device match the deployment condition of the first model, the data processing device directly deploys the first model.

According to the content described above, it can be seen that the process of deploying a model in the data processing device is that, in response to the configuration parameters of the data processing device not matching the deployment condition of the first model, the data processing device obtains a second data set, determines an unquantized first target network layer from the N network layers, quantizes the first target network layer to obtain an updated first model, continues to train the updated first model using the second data set, and continues to determine an unquantized second target network layer from the N network layers, and quantizes the second target network layer until no unquantized network layer exists among the N network layers, to obtain a second model. The data processing device performs quantization conversion on network parameters in the second model based on a quantization coefficient to obtain a quantized model. The deployment condition of the quantized model matches the configuration parameters of the data processing device. The data processing device deploys the quantized model in the data processing device.

The process of performing quantization conversion on network parameters in the second model based on the quantization coefficient is detailed in step S307, and is not described herein.

In step S302, obtain a second data set, and train the first model using the second data set.

For exemplary implementations of step S301 and step S302, reference may be made to the implementations of step S201 and step S202 in FIG. 2. No repeated description is provided herein.

In step S303, in a case that the current number of iterations satisfies a target condition, determine a first target network layer from the N network layers.

In an implementation, the N network layers include M convolutional layers and W fully connected layers connected in sequence, M and W are positive integers, and both M and W are less than N. The data processing device selects an unquantized network layer from the M convolutional layers and the W fully connected layers in sequence, and uses the selected network layer as the first target network layer. For example, in the first model, if layers 3-7 are convolutional layers, layers 21-23 are fully connected layers, and layers 3 and 4 are quantized, the data processing device determines, from shallow to deep, layer 5 as a target to-be-quantized network layer.

In step S304, obtain a quantization coefficient, and determine a pseudo-quantization operator based on the quantization coefficient and a first parameter.

In an implementation, at least one first parameter is provided, and the first parameter is a parameter in the first target network layer. The process of the data processing device obtaining a quantization coefficient includes: determining the number of quantization bits, which is set by a user according to a quantization requirement, or is preset by a developer; and determining a target first parameter that satisfies an absolute value requirement from the at least one first parameter. In an embodiment, the target first parameter is the first parameter having the largest absolute value among the at least one first parameter. Further, the data processing device substitutes the target first parameter and the number of quantization bits into a quantization coefficient operation rule to perform operation to obtain the quantization coefficient.

After obtaining the quantization coefficient, the data processing device determines a pseudo-quantization operator based on the quantization coefficient and the first parameter. In an embodiment, the data processing device performs a division operation on the first parameter and the quantization coefficient, performs a rounding operation on a result of the division operation using a rounding function, and then performs a multiplication operation on a result of the rounding operation and the quantization coefficient, to obtain the pseudo-quantization operator. In an example, the determination method is as shown in formula 1.

$$Q = \text{round}\left(\frac{R}{D}\right) \times D. \quad \text{Formula 1}$$

Q represents the pseudo-quantization operator, R is the first parameter, D represents the quantization coefficient, and round ( ) function represents rounding, i.e., the part greater than or equal to 0.5 is carried up, and the part less than 0.5 is discarded. In an embodiment, $$D = \frac{\text{MAX}}{2^{L-1}}, \text{ and MAX} = \max(\text{abs}(R)),$$

where abs ( ) is an absolute value function; abs(R) represents finding the absolute value of R; max(abs(R)) is the target first parameter, i.e., the first parameter having the largest absolute value; and L is the number of quantization bits. For integerization, L=8, that is, the number of quantization bits is eight.

It can be seen from formula 1 that the pseudo-quantization operator is constructed based on the quantization coefficient. Moreover, it can be seen from the formula of the quantization coefficient that the data processing device determines the quantization coefficient according to the target first parameter and the number of quantization bits. The quantization coefficient is positively correlated with the target first parameter, and the quantization coefficient is negatively correlated with the number of quantization bits.

In step S305, perform operation on the first parameter and the pseudo-quantization operator, and replace the first parameter in the first target network layer with an operation result.

In an implementation, after obtaining the pseudo-quantization operator, the data processing device performs operation on the pseudo-quantization operator and the first parameter to obtain an operation result, where an operation result includes quantized parameters corresponding to parameters in the first target network layer, the operation includes multiplication or division, or the like, and the first parameter is a parameter in the first target network layer, and replaces the parameters in the first target network layer with the quantized parameters to obtain a quantized first target network layer.

Performing operation on the first parameter and the pseudo-quantization operator is performing operation on the first parameter and the pseudo-quantization operator. Step S305 is using the pseudo-quantization operator to perform operation on the first parameter, and replacing the first parameter with an operation result.

In step S306, train an updated first model using the second data set to obtain a second model.

In an implementation, the data processing device updates the first model according to the quantized target network layer to obtain an updated first model. That is, after the target network layer is updated, the updated first model is trained using the second data set, that is, parameters of the updated first model are adjusted to obtain a second model. That is, after the data processing device updates parameters of one network layer in the first model according to the pseudo-quantization operator, other network layers may be affected. Therefore, each time parameters of one network layer are updated, it is necessary to train the updated first model using the second data set to adjust the parameters in the first model, so that a prediction result of the updated first model is closer to an actual result. The actual result herein is a training label of second data.

Further, during the process of training the updated first model using the second data set, in a case that the current number of iterations satisfies the target condition, and a to-be-quantized network layer exists in the N network layers, the data processing device determines the to-be-quantized network layer as a target network layer, and triggers the step of quantizing the target network layer.

That is, during iterative training, by repeating step S303 to step S306, the data processing device can quantize to-be-quantized network layers step by step in a to-be-quantized network model, i.e., perform quantization in stages. That is, one to-be-quantized network layer is selected for quantization each time from the to-be-quantized network model, until all the to-be-quantized network layers in the to-be-quantized network model are quantized and the first model converges, to obtain a final quantized model. The practice has found that processing a model by the data processing method provided in this disclosure can reduce the scale of the neural network model, preserve the representation capability of the neural network model, and reduce the recognition precision loss caused by directly quantizing all network layers in the neural network model.

Step S306 is continuing to train the quantized first model using the second data set, determining a second target network layer from the N network layers, the second target network layer being an unquantized network layer, and quantizing the second target network layer until no unquantized network layer exists among the N network layers, to obtain a second model.

Figure 4A:
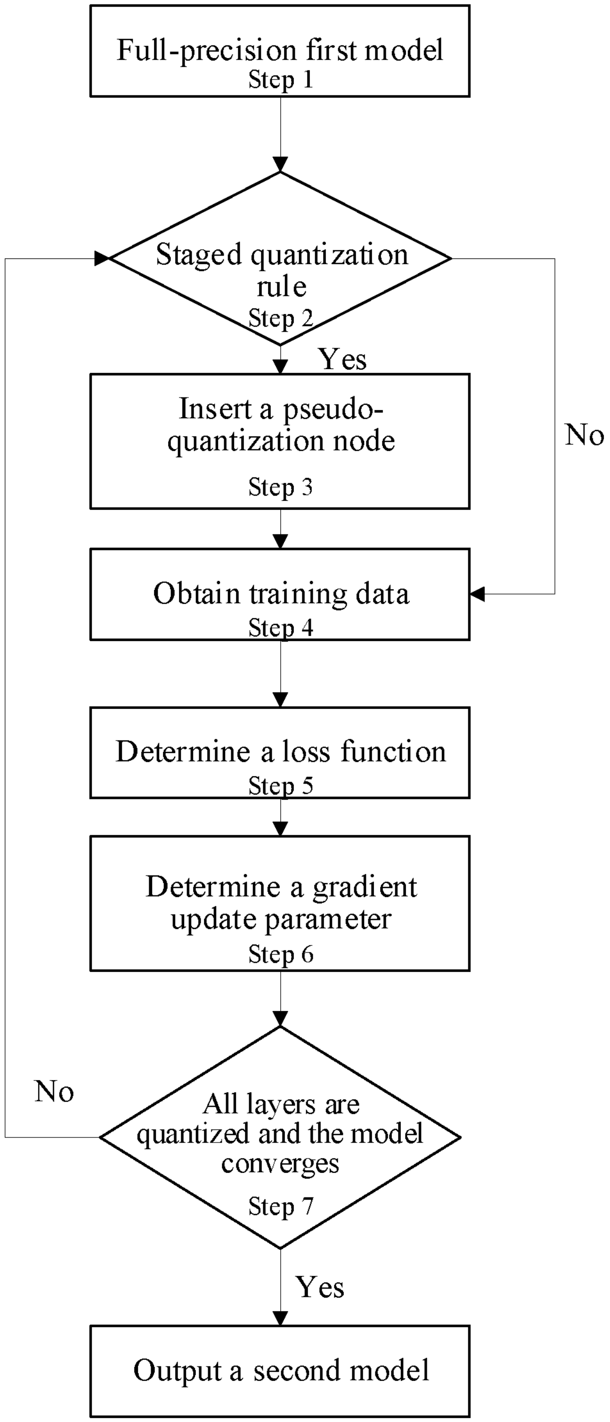
FIG. 4*a* is an update flowchart of a pre-trained model according to an embodiment of this disclosure.

FIG. 4*a* is an update flowchart of a first model according to an embodiment of this disclosure. As shown in FIG. 4*a*, the process of updating the first model includes step 1 to step 7.

In step 1, a data processing device obtains a first model. In an example, parameters of the first model are obtained by pre-training an initial model by a full-precision model training module using a full-precision data set in a training data module. The full-precision data set is a first data set.

In step 2, the data processing device determines the insertion timing and insertion positions of pseudo-quantization nodes according to staged quantization rules. The insertion timing is a target condition for triggering determining a target network layer and quantizing the target network layer. Example rules corresponding to staged layerwise quantization proposed in this disclosure are: from shallow to deep layers, pseudo-quantization operators are inserted at linked positions of to-be-quantized network layers every N steps to simulate actual quantization operations. For example, a pseudo-quantization operator is inserted between two network layers. One step refers to performing a round of forward and reverse operations on a model, i.e., inputting training data into the model to obtain a prediction result, and updating the model according to the prediction result and a label of the training data.

In step 3, in a case that the data processing device determines that a pseudo-quantization operator needs to be inserted in a current network layer, the data processing device inserts the pseudo-quantization operator corresponding to the current network layer according to formula 1. That is, parameters of the current network layer are updated by the pseudo-quantization operator. For the implementation, reference may be to step S304 and step S305. No repeated description is provided herein.

In step 4, the data processing device obtains training data. In an example, the training data is provided by the training data module. For example, the training data is obtained after the training data module quantizes full-precision data.

In step 5, the data processing device performs forward processing in the first model having pseudo-quantization operators to determine a loss function.

In step 6, the data processing device determines the gradient of each parameter in a pre-trained model according to the loss function, and updates the parameters of the first model. In this case, the data processed is still in the form of full precision, and the pseudo-quantization operators only simulate quantization operations.

In step 7, to ensure that all network layers in the first model are quantized, whether an unquantized network layer exists in the first model is determined. In a case that no unquantized network layer exists in the first model and the first model converges, iterative update of the first model is stopped, and a second model is outputted. In a case that an unquantized network layer exists in the first model, steps 2-6 are repeated until no unquantized network layer exists in the first model and the first model converges, to obtain a second model.

In step S307, perform quantization conversion on network parameters in the second model based on the quantization coefficient to obtain a quantized model.

In an implementation, the data processing device obtains a quantization coefficient of a pseudo-quantization operator corresponding to a quantized network layer in the second model and a parameter of the quantized network layer, and converts the second model according to the quantization coefficient of the pseudo-quantization operator corresponding to the quantized network layer and the parameter of the quantized network layer, to obtain a quantized model. The data processing device extracts a quantization coefficient D of each pseudo-quantization operator corresponding to a network layer and a quantized parameter Z=round(R/D) of the corresponding network layer. In this case, Z is a fixed-point number of L bits, and the quantization coefficient D is a full-precision number. For a quantization operator of activation output, in addition to extracting the quantization coefficient D, the corresponding pseudo-quantization operator is retained. After extracting the parameters, the data processing device converts the second model into a quantized model through a model conversion framework. For example, the model conversion framework includes a framework such as tflite (a lightweight inference library) or onnx (open neural network exchange).

In another implementation, after obtaining the quantized model, the data processing device determines, according to configuration parameters of the data processing device, whether the quantized model satisfies a deployment condition, and deploys the quantized model in a case that the quantized model satisfies the deployment condition. In a case that the quantized model does not satisfy the deployment condition, the scale of the quantized model is further reduced by adjusting the number of quantization bits, so as to obtain a quantized model that satisfies the deployment condition. A smaller number of quantization bits indicates a smaller scale of the model. The scale of the model is related to the storage space, computing power, power consumption, or the like required by the model. Therefore, the data processing device can adjust the number of quantization bits used for quantizing the first model to adjust the deployment condition of the quantized model obtained by quantization, so that the deployment condition of the quantized model matches the configuration parameters of the data processing device.

In an implementation, after the data processing device deploys the quantized model, the data processing device obtains to-be-predicted data, quantizes the to-be-predicted data, for example, quantizes the to-be-predicted data via the training data module, and invokes the quantized model to process the quantized to-be-predicted data. In an example, the quantized model is a face recognition model, the data processing device includes a device having an image acquisition function, such as a camera, and the to-be-predicted data is to-be-processed face data. The data processing device acquires to-be-processed face data by a device having an image acquisition function, and quantizes the to-be-processed face data to obtain quantized face data. The quantized face data is quantized to-be-predicted data. The data processing device determines a face area from the quantized face data, for example, crops the quantized face data to obtain a face area, and invokes a face recognition model to perform face recognition on the quantized face area to output a recognition result. It can be understood that, determining the face area from the quantized face data can further reduce the computation amount of the face recognition model, thereby improving the recognition efficiency of the face recognition model. In an example, the quantized model is a voice recognition model, the data processing device includes a voice acquisition device, such as a microphone, and the to-be-predicted data is to-be-recognized voice data. The data processing device acquires the to-be-recognized voice data by the voice acquisition device, and quantizes the to-be-recognized voice data to obtain quantized voice data. The quantized voice data is quantized to-be-predicted data. The data processing device invokes the voice recognition model to perform voice recognition on the quantized voice data to output a recognition result. In an example, the quantized model may also be a prediction model used for, for example, predicting products or videos that users may like, or the quantized model may be a classification model used for, for example, classifying short videos.

In this embodiment of this disclosure, the first model and the second data set are obtained, and the first model is trained using the second data set. The unquantized first target network layer is determined from the N network layers, and the first target network layer is quantized to obtain the updated first model. Next, the updated first model is trained using the second data set, the unquantized second target network layer is determined from the N network layers, and the second target network layer is quantized until no unquantized network layer exists among the N network layers, to obtain the second model. It can be seen that during iterative training of the first model, the first model is updated by quantizing the target network layer, so that the scale of the neural network model can be reduced. The practice has found that, by progressive optimization, a compact and efficient recognition model can be obtained, and the interference of quantization errors on a training process can be significantly lowered, thereby optimizing the performance of the quantized model, such as improving the recognition speed and recognition precision of the quantized model.

Figure 4B:
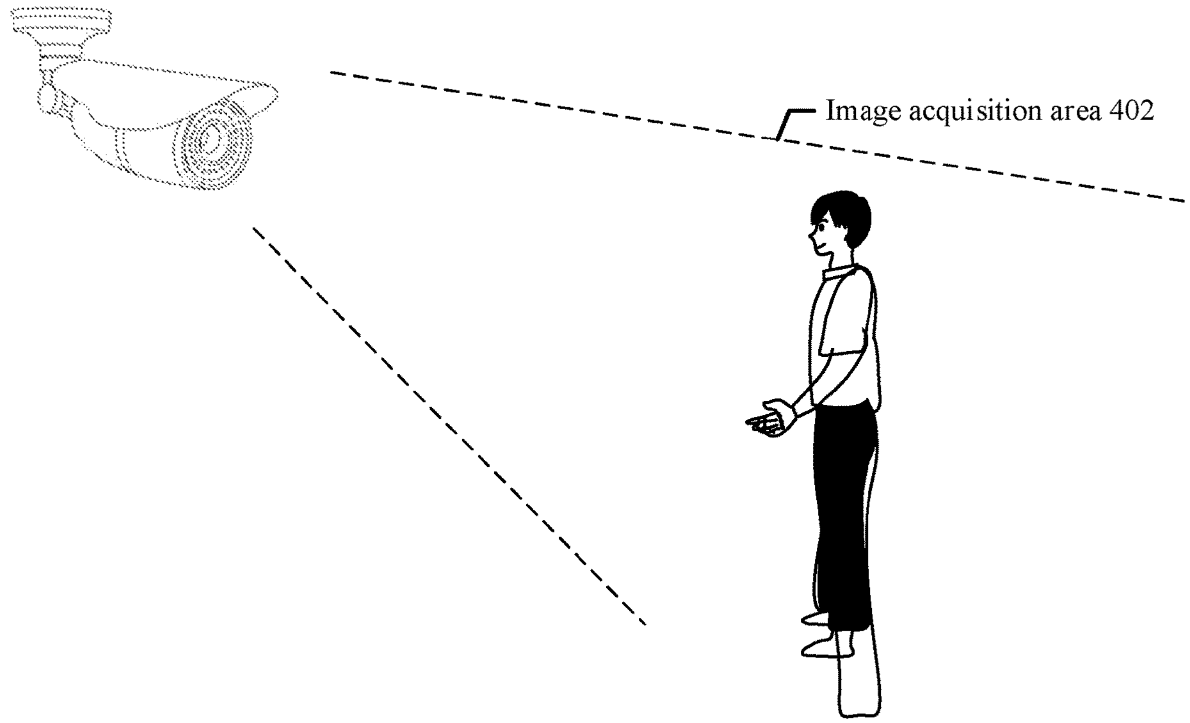
FIG. 4*b* is an application scenario diagram of a quantized model according to an embodiment of this disclosure.

Based on the data processing method described above, the embodiments of this disclosure provide an application scenario of a quantized model. FIG. 4*b* is an application scenario diagram of a quantized model according to an embodiment of this disclosure. In FIG. 4*b*, a data processing device 401 is a camera deployed with a face recognition model. For the deployment method of the face recognition model, reference may be made to steps S201-S204, or to steps S301-S307. No repeated description is provided herein. In addition, the camera stores a target face to be found, such as a photo of a lost child. The camera acquires face data of people passing through an image acquisition area 402, and compares these faces with the target face. In a case that it is detected that a face matching the target face exists in the acquired face data, prompt information is outputted. The face matching the target face means that the similarity between the face and the target face is higher than a threshold. In an example, the data processing device 401 quantizes the face data acquired in the area 402 to obtain quantized face data. For example, the face data is a face image, and quantizing the face image is adjusting the definition of the face image. The data processing device 401 determines a quantized face area from the quantized face data, and invokes the face recognition model to perform face recognition on the quantized face area to output a face recognition result. In an example, performing face recognition on the quantized face area is detecting the similarity between the quantized face area and the target face.

Figure 4C:
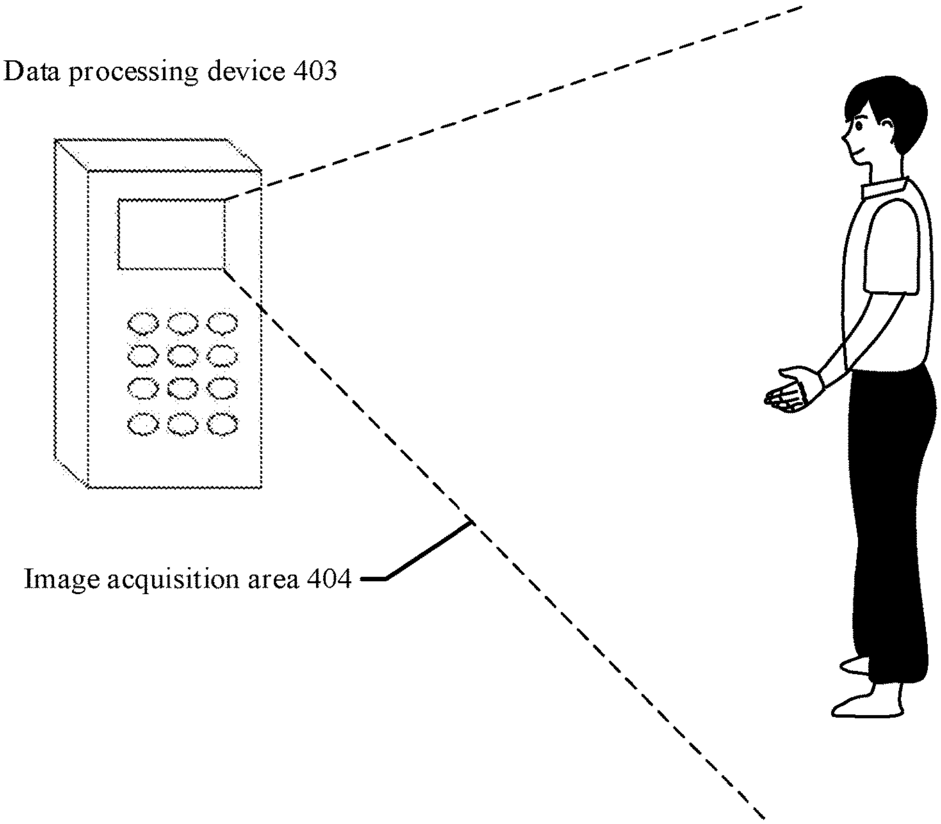
FIG. 4*c* is an application scenario diagram of another quantized model according to an embodiment of this disclosure.

FIG. 4*c* is an application scenario diagram of another quantized model according to an embodiment of this disclosure. In FIG. 4*c*, a data processing device 403 is an access control device deployed with a face recognition model. The face of a target user having permission to open a gate is stored in the access control device. In response to detecting a request to open the gate, the access control device acquires the face of a requesting user who currently requests to open the gate, and in a case that the face of the requesting user matches the face of the target user, the gate is opened, otherwise prompt information is outputted. The prompt information is used for prompting that the requesting user does not have permission to open the gate. In an example, the data processing device 403 quantizes face data acquired in an image acquisition area 404 to obtain quantized face data. For example, the face data is a face image, and quantizing the face image is adjusting the definition of the face image. The data processing device 403 determines a face area from the quantized face data, invokes the face recognition model to perform face recognition on the quantized face area, opens the gate in a case that the face recognition is successful, and in a case that the face recognition fails (the similarity is lower than the threshold), prompts that the requesting user does not have permission to open the gate. In an example, performing face recognition on the quantized face area is detecting the similarity between the quantized face area and the face of the target user. In a case that the similarity is higher than the threshold, it means that the face recognition is successful, and in a case that the similarity is not higher than the threshold, it means that the face recognition fails.

The method according to the embodiments of this disclosure is described in detail above. To facilitate better implementation of the solutions of the embodiments of this disclosure, an apparatus according to the embodiments of this disclosure is correspondingly provided below.

Figure 5:
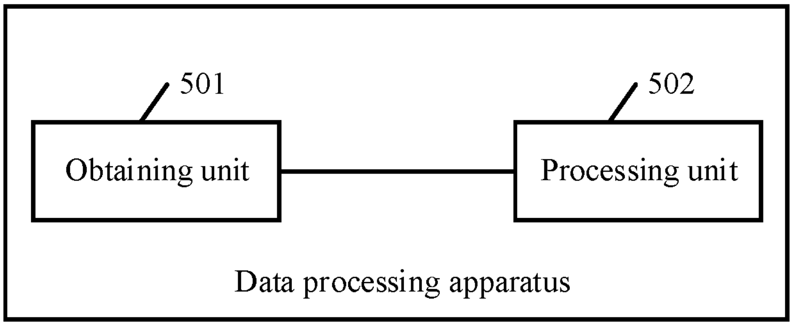
FIG. 5 is a schematic structural diagram of a data processing apparatus according to an embodiment of this disclosure.

FIG. 5 is a schematic structural diagram of a data processing apparatus according to an embodiment of this disclosure. The apparatus can be mounted on the data processing device 101 or model storage device 102 shown in FIG. 1*a*. The data processing apparatus shown in FIG. 5 can be configured to perform some or all of the functions in the method embodiments described above in FIG. 2 and FIG. 3. One or more modules, submodules, and/or units of the apparatus can be implemented by processing circuitry, software, or a combination thereof, for example.

An obtaining unit 501 is configured to train a first model using a first data set, the first data set including first data and a training label of the first data, the first data being unprocessed data, the first model including N network layers, and N being a positive integer.

A processing unit 502 is configured to train the first model using a second data set, the second data set including second data and a training label corresponding to the second data, and the second data being quantized data; to determine a first target network layer from the N network layers, the first target network layer being an unquantized network layer, and quantize the first target network layer; and to train the quantized first model using the second data set, determine a second target network layer from the N network layers, the second target network layer being an unquantized network layer, and quantize the second target network layer until no unquantized network layer exists among the N network layers, to obtain a second model.

In an embodiment, the processing unit 502 is configured to obtain a quantization coefficient, and construct a pseudo-quantization operator based on the quantization coefficient; and use the pseudo-quantization operator to perform operation on a first parameter, and replace the first parameter with an operation result, where the first parameter is a parameter in the first target network layer.

In an embodiment, at least one first parameter is provided. The processing unit 502 is configured to determine the number of quantization bits, and determine a target first parameter from the at least one first parameter, where the target first parameter satisfies an absolute value requirement; and determine the quantization coefficient according to the target first parameter and the number of quantization bits, where the quantization coefficient is positively correlated with the target first parameter, and the quantization coefficient is negatively correlated with the number of quantization bits.

In an embodiment, the processing unit 502 is configured to perform a division operation on the first parameter and the quantization coefficient, and perform a rounding operation on a result of the division operation using a rounding function; and perform a multiplication operation on a result of the rounding operation and the quantization coefficient to obtain the operation result.

In an embodiment, the N network layers include M convolutional layers and W fully connected layers connected in sequence, M and W are positive integers, and both M and W are less than N, and the processing unit 502 is configured to select an unquantized network layer from the M convolutional layers and the W fully connected layers in sequence; and use the selected network layer as the first target network layer.

In an embodiment, the processing unit 502 is further configured to determine, in a case that the current number of iterations satisfies a target condition and an unquantized network layer exists among the N network layers, the unquantized network layer as the first target network layer.

In an embodiment, the target condition includes: the current number of iterations is exactly divisible by P, where P is a positive integer.

In an embodiment, the processing unit 502 is configured to perform quantization conversion on network parameters in the second model based on the quantization coefficient to obtain a quantized model.

In an embodiment, the processing unit 502 is configured to obtain a quantization coefficient of a pseudo-quantization operator corresponding to a quantized network layer in the second model, and a parameter of the quantized network layer; and convert the second model according to the quantization coefficient of the pseudo-quantization operator corresponding to the quantized network layer and the parameter of the quantized network layer to obtain the quantized model.

In an embodiment, the processing unit 502 is further configured to obtain configuration parameters of a data processing device in response to a request for deploying the first model in the data processing device; perform the step of training the first model using a second data set in response to the configuration parameters of the data processing device not matching a deployment condition of the first model; perform quantization conversion on network parameters in the second model based on a quantization coefficient to obtain a quantized model, where the deployment condition of the quantized model matches the configuration parameters of the data processing device; and deploy the quantized model in the data processing device.

In an embodiment, the quantized model is a face recognition model. The processing unit 502 is further configured to acquire to-be-recognized face data; quantize the to-be-recognized face data to obtain quantized face data; determine a face area from the quantized face data; and invoke the quantized model to recognize the face area to output a recognition result.

According to an embodiment of this disclosure, some of the steps involved in the data processing method shown in FIG. 2 and FIG. 3 may be performed by the units in the data processing apparatus shown in FIG. 5. For example, steps S201 and S202 shown in FIG. 2 may be performed by the obtaining unit 501 shown in FIG. 5, and steps S203 and S204 may be performed by the processing unit 502 shown in FIG. 5. Steps S301 and S302 shown in FIG. 3 may be performed by the obtaining unit 501 shown in FIG. 5, and steps S303 to S308 may be performed by the processing unit 502 shown in FIG. 5. The units in the data processing apparatus shown in FIG. 5 are separately or wholly combined into one or several other units, or one or some of the units can further be divided into multiple units of smaller functions, to implement the same operation, without affecting the implementation of the technical effects of the embodiments of this disclosure. The foregoing units are divided based on logical functions. In actual application, a function of one unit can be implemented by multiple units, or functions of multiple units are implemented by one unit. In another embodiment of this disclosure, the data processing apparatus includes another unit. In actual application, these functions can also be cooperatively implemented by another unit and cooperatively implemented by multiple units.

According to another embodiment of this disclosure, the data processing apparatus shown in FIG. 5 is constructed and the data processing method according to the embodiments of this disclosure is implemented by running a computer program (including program code) that can perform the steps involved in the corresponding methods shown in FIG. 2 and FIG. 3 on processing elements and memory elements including a central processing unit (CPU), a random access memory (RAM), a read-only memory (ROM), and the like, for example, a general-purpose computing device of a computer. The computer program may be recorded in, for example, a computer-readable recording medium, and may be loaded on the computing device by using the computer-readable recording medium, and run in the computing device.

Based on similar concepts, the data processing apparatus according to the embodiments of this disclosure has a problem-resolving principle and beneficial effect similar to the problem-resolving principle and beneficial effect of the data processing method of this disclosure. Therefore, reference may be made to the principle and beneficial effect of the implementation of the method. For the sake of brevity, details are not provided herein.

Figure 6:
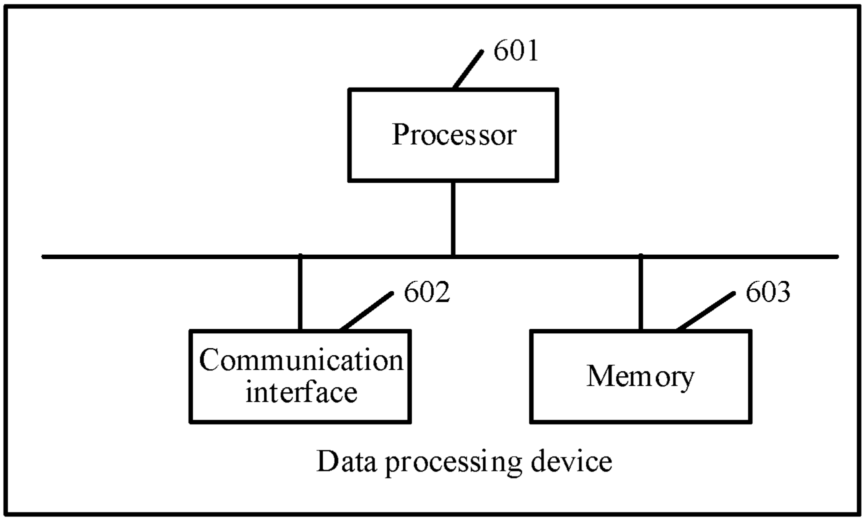
FIG. 6 is a schematic structural diagram of a data processing device according to an embodiment of this disclosure.

FIG. 6 is a schematic structural diagram of a data processing device according to an embodiment of this disclosure. The data processing device includes at least processing circuitry (such as a processor 601), a communication interface 602, and a memory 603. The processor 601, the communication interface 602, and the memory 603 may be connected via a bus or in another manner. The processor 601 (or referred to as a central processing unit (CPU)) is a computing core and control core of a terminal, and can parse various instructions in the terminal and process various data of the terminal. The CPU can be configured to parse power-on/off instructions sent by a user to the terminal, and control the terminal to perform power-on/off operations; For another example, the CPU is capable of transmitting various interactive data between internal structures of the terminal, and so on. In an example, the communication interface 602 include a wired interface and a wireless interface (such as Wi-Fi and a mobile communication interface), and is configured to transmit and receive data under control of the processor 601. The communication interface 602 can also be used for transmission and interaction of internal data of the terminal. The memory 603 is a memory device of the terminal and is configured to store a program and data. It is to be understood that the memory 603 here may include an internal memory of the terminal, and may also include an expanded memory supported by the terminal. The memory 603 provides a storage space. The storage space stores an operating system of the terminal, which may include but is not limited to: an Android system, an iOS system, a Windows Phone system, or the like. This is not limited in this disclosure.

In this embodiment of this disclosure, the processor 601 is configured to perform the following operations by running executable program code in the memory 603:

training a first model using a first data set, the first data set including first data and a training label of the first data, the first data being unprocessed data, the first model including N network layers, and N being a positive integer;

training the first model using a second data set, the second data set including second data and a training label of the second data, and the second data being quantized data;

determining a first target network layer from the N network layers, the first target network layer being an unquantized network layer, and quantizing the first target network layer; and training the quantized first model using the second data set, determining a second target network layer from the N network layers, the second target network layer being an unquantized network layer, and quantizing the second target network layer until no unquantized network layer exists among the N network layers, to obtain a second model.

In an embodiment, the processor 601 is further configured to perform the following operations:

obtaining a quantization coefficient, and constructing a pseudo-quantization operator based on the quantization coefficient; and using the pseudo-quantization operator to perform operation on a first parameter, and replacing the first parameter with an operation result, where the first parameter is a parameter in the first target network layer.

In an embodiment, at least one first parameter is provided, and the processor 601 is further configured to perform the following operations:

determining the number of quantization bits, and determining a target first parameter from the at least one first parameter, where the target first parameter satisfies an absolute value requirement; and determining the quantization coefficient according to the target first parameter and the number of quantization bits, where the quantization coefficient is positively correlated with the target first parameter, and the quantization coefficient is negatively correlated with the number of quantization bits.

In an embodiment, the processor 601 is further configured to perform the following operations:

performing a division operation on the first parameter and the quantization coefficient, and performing a rounding operation on a result of the division operation using a rounding function; and performing a multiplication operation on a result of the rounding operation and the quantization coefficient to obtain the operation result.

In an embodiment, the N network layers include M convolutional layers and W fully connected layers connected in sequence, M and W are positive integers, and both M and W are less than N, and the processor 601 is further configured to perform the following operations:

selecting an unquantized network layer from the M convolutional layers and the W fully connected layers in sequence; and using the selected network layer as the first target network layer.

In an embodiment, the processor 601 is further configured to perform the following operations:

determining, in a case that the current number of iterations satisfies a target condition and an unquantized network layer exists among the N network layers, the unquantized network layer as the first target network layer.

In an embodiment, the target condition includes: the current number of iterations is exactly divisible by P, where P is a positive integer.

In an embodiment, the processor 601 is further configured to perform the following operations:

performing quantization conversion on network parameters in the second model based on the quantization coefficient to obtain a quantized model.

In an embodiment, the processor 601 is further configured to perform the following operations:

obtaining a quantization coefficient of a pseudo-quantization operator corresponding to a quantized network layer in the second model, and a parameter of the quantized network layer; and converting the second model according to the quantization coefficient of the pseudo-quantization operator corresponding to the quantized network layer and the parameter of the quantized network layer to obtain the quantized model.

In an embodiment, the processor 601 is further configured to perform the following operations:

obtaining configuration parameters of a data processing device in response to a request for deploying the first model in the data processing device;

performing the step of training the first model using a second data set in response to the configuration parameters of the data processing device not matching a deployment condition of the first model;

performing quantization conversion on network parameters in the second model based on a quantization coefficient to obtain a quantized model, where the deployment condition of the quantized model matches the configuration parameters of the data processing device; and deploying the quantized model in the data processing device.

In an embodiment, the quantized model is a face recognition model, and the processor 601 is further configured to perform the following operations:

acquiring to-be-recognized face data;

quantizing the to-be-recognized face data to obtain quantized face data;

determining a face area from the quantized face data; and invoking the quantized model to recognize the face area to output a recognition result.

Based on similar concepts, the data processing device according to the embodiments of this disclosure has a problem-resolving principle and beneficial effect similar to the problem-resolving principle and beneficial effect of the data processing method according to the method embodiments of this disclosure. Therefore, reference may be made to the principle and beneficial effect of the implementation of the method. For the sake of brevity, no repeated description is provided herein.

An embodiment of this disclosure further provides a computer-readable storage medium. The computer-readable storage medium stores one or more instructions. The one or more instructions are configured to be loaded by a processor to perform the following operations:

training a first model using a first data set, the first data set including first data and a training label of the first data, the first data being unprocessed data, the first model including N network layers, and N being a positive integer;

training the first model using a second data set, the second data set including second data and a training label of the second data, and the second data being quantized data;

determining a first target network layer from the N network layers, the first target network layer being an unquantized network layer, and quantizing the first target network layer; and training the quantized first model using the second data set, determining a second target network layer from the N network layers, the second target network layer being an unquantized network layer, and quantizing the second target network layer until no unquantized network layer exists among the N network layers, to obtain a second model.

In an embodiment, the one or more instructions are further configured to be loaded by the processor to perform the following operations:

obtaining a quantization coefficient, and constructing a pseudo-quantization operator based on the quantization coefficient; and using the pseudo-quantization operator to perform operation on a first parameter, and replacing the first parameter with an operation result, where the first parameter is a parameter in the first target network layer.

In an embodiment, at least one first parameter is provided, and the one or more instructions are further configured to be loaded by the processor to perform the following operations:

determining the number of quantization bits, and determining a target first parameter from the at least one first parameter, where the target first parameter satisfies an absolute value requirement; and determining the quantization coefficient according to the target first parameter and the number of quantization bits, where the quantization coefficient is positively correlated with the target first parameter, and the quantization coefficient is negatively correlated with the number of quantization bits.

In an embodiment, the one or more instructions are further configured to be loaded by the processor to perform the following operations:

performing a division operation on the first parameter and the quantization coefficient, and performing a rounding operation on a result of the division operation using a rounding function; and performing a multiplication operation on a result of the rounding operation and the quantization coefficient to obtain the operation result.

In an embodiment, the N network layers include M convolutional layers and W fully connected layers connected in sequence, M and W are positive integers, and both M and W are less than N, and the one or more instructions are further configured to be loaded by the processor to perform the following operations:

selecting an unquantized network layer from the M convolutional layers and the W fully connected layers in sequence; and using the selected network layer as the first target network layer.

In an embodiment, the one or more instructions are further configured to be loaded by the processor to perform the following operations:

determining, in a case that the current number of iterations satisfies a target condition and an unquantized network layer exists among the N network layers, the unquantized network layer as the first target network layer.

In an embodiment, the target condition includes: the current number of iterations is exactly divisible by P, where P is a positive integer.

In an embodiment, the one or more instructions are further configured to be loaded by the processor to perform the following operations:

performing quantization conversion on network parameters in the second model based on the quantization coefficient to obtain a quantized model.

In an embodiment, the one or more instructions are further configured to be loaded by the processor to perform the following operations:

obtaining a quantization coefficient of a pseudo-quantization operator corresponding to a quantized network layer in the second model, and a parameter of the quantized network layer; and converting the second model according to the quantization coefficient of the pseudo-quantization operator corresponding to the quantized network layer and the parameter of the quantized network layer to obtain the quantized model.

In an embodiment, the one or more instructions are further configured to be loaded by the processor to perform the following operations:

obtaining configuration parameters of a data processing device in response to a request for deploying the first model in the data processing device;

performing the step of training the first model using a second data set in response to the configuration parameters of the data processing device not matching deployment condition of the first model;

performing quantization conversion on network parameters in the second model based on a quantization coefficient to obtain a quantized model, where the deployment condition of the quantized model matches the configuration parameters of the data processing device; and deploying the quantized model in the data processing device.

In an embodiment, the quantized model is a face recognition model, and the one or more instructions are further configured to be loaded by the processor to perform the following operations:

acquiring to-be-recognized face data;

quantizing the to-be-recognized face data to obtain quantized face data;

determining a face area from the quantized face data; and invoking the quantized model to recognize the face area to output a recognition result.

An embodiment of this disclosure further provides a computer program product including instructions. The computer program product, when run on a computer, causes the computer to perform the data processing method according to the foregoing method embodiments.

An embodiment of this disclosure further provides a computer program product or computer program. The computer program product or computer program includes computer instructions, and the computer instructions are stored in a computer-readable storage medium. A processor of a computer device reads the computer instructions from the computer-readable storage medium, and the processor executes the computer instructions, so that the computer device performs the following operations:

training a first model using a first data set, the first data set including first data and a training label of the first data, the first data being unprocessed data, the first model including N network layers, and N being a positive integer;

training the first model using a second data set, the second data set including second data and a training label of the second data, and the second data being quantized data;

determining a first target network layer from the N network layers, the first target network layer being an unquantized network layer, and quantizing the first target network layer; and training the quantized first model using the second data set, determining a second target network layer from the N network layers, the second target network layer being an unquantized network layer, and quantizing the second target network layer until no unquantized network layer exists among the N network layers, to obtain a second model.

In an embodiment, the processor further executes the computer instructions, so that the computer device performs the following operations:

obtaining a quantization coefficient, and constructing a pseudo-quantization operator based on the quantization coefficient; and using the pseudo-quantization operator to perform operation on a first parameter, and replacing the first parameter with an operation result, where the first parameter is a parameter in the first target network layer.

In an embodiment, at least one first parameter is provided, and the processor further executes the computer instructions, so that the computer device performs the following operations:

determining the number of quantization bits, and determining a target first parameter from the at least one first parameter, where the target first parameter satisfies an absolute value requirement; and determining the quantization coefficient according to the target first parameter and the number of quantization bits, where the quantization coefficient is positively correlated with the target first parameter, and the quantization coefficient is negatively correlated with the number of quantization bits.

In an embodiment, the processor further executes the computer instructions, so that the computer device performs the following operations:

performing a division operation on the first parameter and the quantization coefficient, and performing a rounding operation on a result of the division operation using a rounding function; and performing a multiplication operation on a result of the rounding operation and the quantization coefficient to obtain the operation result.

In an embodiment, the N network layers include M convolutional layers and W fully connected layers connected in sequence, where M and W are positive integers, and both M and W are less than N, and the processor further executes the computer instructions, so that the computer device performs the following operations:

selecting an unquantized network layer from the M convolutional layers and the W fully connected layers in sequence; and using the selected network layer as the first target network layer.

In an embodiment, the processor further executes the computer instructions, so that the computer device performs the following operations:

determining, in a case that the current number of iterations satisfies a target condition and an unquantized network layer exists among the N network layers, the unquantized network layer as the first target network layer.

In an embodiment, the target condition includes: the current number of iterations is exactly divisible by P, where P is a positive integer.

In an embodiment, the processor further executes the computer instructions, so that the computer device performs the following operations:

performing quantization conversion on network parameters in the second model based on the quantization coefficient to obtain a quantized model.

In an embodiment, the processor further executes the computer instructions, so that the computer device performs the following operations:

obtaining a quantization coefficient of a pseudo-quantization operator corresponding to a quantized network layer in the second model, and a parameter of the quantized network layer; and converting the second model according to the quantization coefficient of the pseudo-quantization operator corresponding to the quantized network layer and the parameter of the quantized network layer to obtain the quantized model.

In an embodiment, the processor further executes the computer instructions, so that the computer device performs the following operations:

obtaining configuration parameters of a data processing device in response to a request for deploying the first model in the data processing device;

performing the step of training the first model using a second data set in response to the configuration parameters of the data processing device not matching a deployment condition of the first model;

performing quantization conversion on network parameters in the second model based on a quantization coefficient to obtain a quantized model, where the deployment condition of the quantized model matches the configuration parameters of the data processing device; and deploying the quantized model in the data processing device.

In an embodiment, the quantized model is a face recognition model, and the processor further executes the computer instructions, so that the computer device performs the following operations:

acquiring to-be-recognized face data;

quantizing the to-be-recognized face data to obtain quantized face data;

determining a face area from the quantized face data; and invoking the quantized model to recognize the face area to output a recognition result.

The steps of the method according to the embodiments of this disclosure may be adjusted, combined, and deleted according to actual requirements.

Modules in the apparatus in the embodiments of this disclosure can be combined, divided, and deleted according to actual requirements. The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

All or some steps in the methods in the foregoing embodiments may be performed by a program instructing related hardware. The program may be stored in a computer-readable storage medium, such as a non-transitory computer-readable storage medium. The readable storage medium includes: a flash disk, a ROM, a RAM, a magnetic disk, an optical disc, and the like.

The content disclosed above are merely exemplary embodiments of this disclosure, and are not intended to limit the scope of this disclosure. Other embodiments are within the scope of the present disclosure.

What is claimed is:

1. A data processing method, comprising:

obtaining a first model that includes N network layers, the first model being trained with a first data set that includes first data and training label information of the first data, N being a positive integer;

training the first model with a second data set, the second data set including second data and training label information of the second data, the second data being quantized;

quantizing a first unquantized target network layer of the N network layers to obtain a first quantized target network layer, a parameter of the first unquantized target network layer being replaced with a quantized parameter that has a lower numerical precision than a numerical precision of the parameter of the first unquantized target network layer; and training an updated first model that includes the first quantized target network layer with the second data set to obtain a second model.

2. The method according to claim 1, wherein a numerical precision of the first data is higher than a numerical precision of the second data.

3. The method according to claim 1, further comprising: quantizing each remaining unquantized target network layer of the N network layers to obtain the second model.

4. The method according to claim 1, wherein the quantizing the first unquantized target network layer comprises:

obtaining a quantization coefficient, and constructing a pseudo-quantization operator based on the quantization coefficient;

performing an operation on the parameter in the first unquantized target network layer based on the pseudo-quantization operator; and replacing the parameter in the first unquantized target network layer with the quantized parameter that is a result of the operation performed on the parameter in the first unquantized target network layer.

5. The method according to claim 4, wherein the obtaining the quantization coefficient comprises:

determining a number of quantization bits;

determining a target parameter from at least one parameter in the first unquantized target network layer that satisfies an absolute value requirement; and determining the quantization coefficient according to the target parameter and the number of quantization bits, the quantization coefficient being positively correlated with the target parameter, and the quantization coefficient being negatively correlated with the number of quantization bits.

6. The method according to claim 4, wherein the performing the operation on the parameter in the first unquantized target network layer comprises:

performing a division operation on the parameter in the first unquantized target network layer and the quantization coefficient;

performing a rounding operation on a result of the division operation with a rounding function; and performing a multiplication operation on a result of the rounding operation and the quantization coefficient to obtain the quantized parameter that is the result of the operation performed on the parameter in the first unquantized target network layer.

7. The method according to claim 1, wherein the N network layers include M convolutional layers and W fully connected layers connected in sequence, M and W being positive integers and less than N; and the method further comprises: selecting an unquantized network layer from the M convolutional layers and the W fully connected layers in sequence as the first unquantized target network layer.

8. The method according to claim 1, further comprising:

determining, based on a current number of iterations satisfying a target condition and an unquantized network layer existing among the N network layers, the unquantized network layer as the first unquantized target network layer.

9. The method according to claim 8, wherein the target condition includes the current number of iterations being divisible by P, P being a positive integer.

10. The method according to claim 3, further comprising:

performing quantization conversion on network parameters in the second model based on a quantization coefficient to obtain a quantized model.

11. The method according to claim 10, wherein the performing the quantization conversion comprises:

obtaining the quantization coefficient of a pseudo-quantization operator corresponding to a quantized network layer in the second model and a parameter of the quantized network layer in the second model; and converting the second model according to the quantization coefficient of the pseudo-quantization operator corresponding to the quantized network layer in the second model and the parameter of the quantized network layer in the second model to obtain the quantized model.

12. The method according to claim 1, further comprising:

obtaining configuration parameters of a data processing device in response to a request for deploying the first model in the data processing device;

performing the training of the first model with the second data set in response to the configuration parameters of the data processing device not matching a deployment condition of the first model;

performing quantization conversion on network parameters in the second model based on a quantization coefficient to obtain a quantized model, wherein the deployment condition of the quantized model matches the configuration parameters of the data processing device; and deploying the quantized model in the data processing device.

13. The method according to claim 12, wherein the quantized model is a face recognition model, and the method further comprises:

acquiring to-be-recognized face data;

quantizing the to-be-recognized face data to obtain quantized face data;

determining a face area from the quantized face data; and invoking the quantized model to recognize the face area to output a recognition result.

14. A data processing apparatus, comprising:

processing circuitry configured to:

obtain a first model that includes N network layers, the first model being trained with a first data set that includes first data and training label information of the first data, N being a positive integer;

train the first model with a second data set, the second data set including second data and training label information of the second data, the second data being quantized;

quantize a first unquantized target network layer of the N network layers to obtain a first quantized target network layer, a parameter of the first unquantized target network layer being replaced with a quantized parameter that has a lower numerical precision than a numerical precision of the parameter of the first unquantized target network layer; and train an updated first model that includes the first quantized target network layer with the second data set to obtain a second model.

15. The data processing apparatus according to claim 14, wherein a numerical precision of the first data is higher than a numerical precision of the second data.

16. The data processing apparatus according to claim 14, wherein the processing circuitry is configured to:

quantize each remaining unquantized target network layer of the N network layers to obtain the second model.

17. The data processing apparatus according to claim 14, wherein the processing circuitry is configured to:

obtain a quantization coefficient, and construct a pseudo-quantization operator based on the quantization coefficient;

perform an operation on the parameter in the first unquantized target network layer based on the pseudo-quantization operator; and replace the parameter in the first unquantized target network layer with the quantized parameter that is a result of the operation performed on the parameter in the first unquantized target network layer.

18. The data processing apparatus according to claim 17, wherein the processing circuitry is configured to:

determine a number of quantization bits;

determine a target parameter from at least one parameter in the first unquantized target network layer that satisfies an absolute value requirement; and determine the quantization coefficient according to the target parameter and the number of quantization bits, the quantization coefficient being positively correlated with the target parameter, and the quantization coefficient being negatively correlated with the number of quantization bits.

19. A non-transitory computer-readable storage medium, storing instructions which when executed by a processor cause the processor to perform:

obtaining a first model that includes N network layers, the first model being trained with a first data set that includes first data and training label information of the first data, N being a positive integer;

training the first model with a second data set, the second data set including second data and training label information of the second data, the second data being quantized;

quantizing a first unquantized target network layer of the N network layers to obtain a first quantized target network layer, a parameter of the first unquantized target network layer being replaced with a quantized parameter that has a lower numerical precision than a numerical precision of the parameter of the first unquantized target network layer; and training an updated first model that includes the first quantized target network layer with the second data set to obtain a second model.

20. The method according to claim 6, wherein the division operation includes dividing the parameter in the first unquantized target network layer by the quantization coefficient; and the multiplication operation includes multiplying the result of the rounding operation by the quantization coefficient.

* * * * *